(12) United States Patent
Yamamoto et al.

(10) Patent No.: US 7,692,422 B2
(45) Date of Patent: Apr. 6, 2010

(54) BEARING ASSEMBLY HAVING ROTATION SENSOR AND MOUNTING STRUCTURE TO SUPPORT SENSOR CAP AND CONNECTOR

(75) Inventors: Kazunari Yamamoto, Iwata (JP); Hisashi Ohtsuki, Iwata (JP)

(73) Assignee: NTN Corporation, Osaka (JP)

( * ) Notice: Subject to any disclaimer, the term of this patent is extended or adjusted under 35 U.S.C. 154(b) by 269 days.

(21) Appl. No.: 11/662,707

(22) PCT Filed: Sep. 6, 2005

(86) PCT No.: PCT/JP2005/016321
§ 371 (c)(1),
(2), (4) Date: Mar. 14, 2007

(87) PCT Pub. No.: WO2006/030669
PCT Pub. Date: Mar. 23, 2006

(65) Prior Publication Data
US 2007/0268013 A1    Nov. 22, 2007

(30) Foreign Application Priority Data
Sep. 15, 2004  (JP) ............................. 2004-268211
Nov. 9, 2004   (JP) ............................. 2004-325197

(51) Int. Cl.
*G01P 3/48*   (2006.01)
*F16C 19/08*  (2006.01)

(52) U.S. Cl. .................... 324/174; 324/207.25; 384/448

(58) Field of Classification Search .................. None
See application file for complete search history.

(56) References Cited

U.S. PATENT DOCUMENTS 5,200,697 A    4/1993  Adler et al.
5,332,964 A *  7/1994  Ouchi ......................... 324/174
5,547,290 A *  8/1996  Ouchi et al. ................. 384/448
5,602,335 A    2/1997  Ouchi (Continued)

FOREIGN PATENT DOCUMENTS

JP    06-094747    4/1994

(Continued)

OTHER PUBLICATIONS

Japanese abstract of Japan, Japanese Publication No. 08-114615, Published May 7, 1996 (1pg).

(Continued)

*Primary Examiner*—Jay M Patidar

(57) ABSTRACT

A wheel support bearing assembly includes an outer member inserted in a knuckle, an inner member made up of a hub axle, double rows of rolling elements, and a cover closing an opening of one end of the outer member. The cover includes a sensor connector and a sensor cap. A pulsar ring is mounted on the inner race and a rotation sensor is opposed to the pulsar ring and embedded in the sensor connector. The cover extends over an outer surface of the sensor connector. The cover has a cylindrical portion mounted in an inner peripheral surface of one end of the outer member, which end forms a pilot portion for the knuckle. The cylindrical portion of the cover has an outer periphery provided with an annular elastic member held in contact with an inner peripheral surface of the knuckle.

5 Claims, 8 Drawing Sheets

U.S. PATENT DOCUMENTS

| | | | |
|---|---|---|---|
| 5,622,436 | A | 4/1997 | Morita et al. |
| 5,714,880 | A * | 2/1998 | Miyazaki et al. ............ 324/173 |
| 5,779,368 | A | 7/1998 | Morita et al. |
| 5,814,984 | A | 9/1998 | Ohmi et al. |
| 5,821,422 | A | 10/1998 | Ouchi |
| 5,967,669 | A * | 10/1999 | Ouchi ........................ 384/448 |
| 6,053,046 | A | 4/2000 | Masaki et al. |
| 6,218,827 | B1 * | 4/2001 | Ohmi et al. ................. 324/174 |
| 6,229,298 | B1 * | 5/2001 | Sakamoto et al. ........... 324/174 |
| 6,250,811 | B1 * | 6/2001 | Mizukoshi et al. .......... 384/448 |
| 7,520,676 | B2 * | 4/2009 | Takahashi et al. ........... 384/448 |
| 7,556,435 | B2 * | 7/2009 | Nagata et al. ............... 384/448 |
| 2002/0014888 | A1 * | 2/2002 | Harada ....................... 324/174 |

FOREIGN PATENT DOCUMENTS

| | | |
|---|---|---|
| JP | 07-158676 | 6/1995 |
| JP | 8-86797 | 4/1996 |
| JP | 8-114615 | 5/1996 |
| JP | 8-184602 | 7/1996 |
| JP | 9-311136 | 12/1997 |

OTHER PUBLICATIONS

Japanese abstract of Japan, Japanese Publication No. 08-184602, Published Jul. 16, 1996 (1pg).

Japanese abstract of Japan, Japanese Publication No. 08-285879, Published Nov. 1, 1996 (1pg).

Japanese abstract of Japan, Japanese Publication No. 09-329611, Published Dec. 22, 1997 (1pg).

Japanese abstract of Japan, Japanese Publication No. 05-264562, Published Oct. 12, 1993 (1pg).

International Search Report of International Published Application PCT/JP2005/016321 (mailed Dec. 13, 2005.).

International Preliminary Report on Patentability issued in corresponding International Patent Application No. PCT/JP2005/016321, mailed on May 3, 2007.

Japanese Office Action issued Oct. 27, 2009 in corresponding Japanese Patent Application 2004-268211.

* cited by examiner

Fig. 10 – Prior Art

Press-fitting

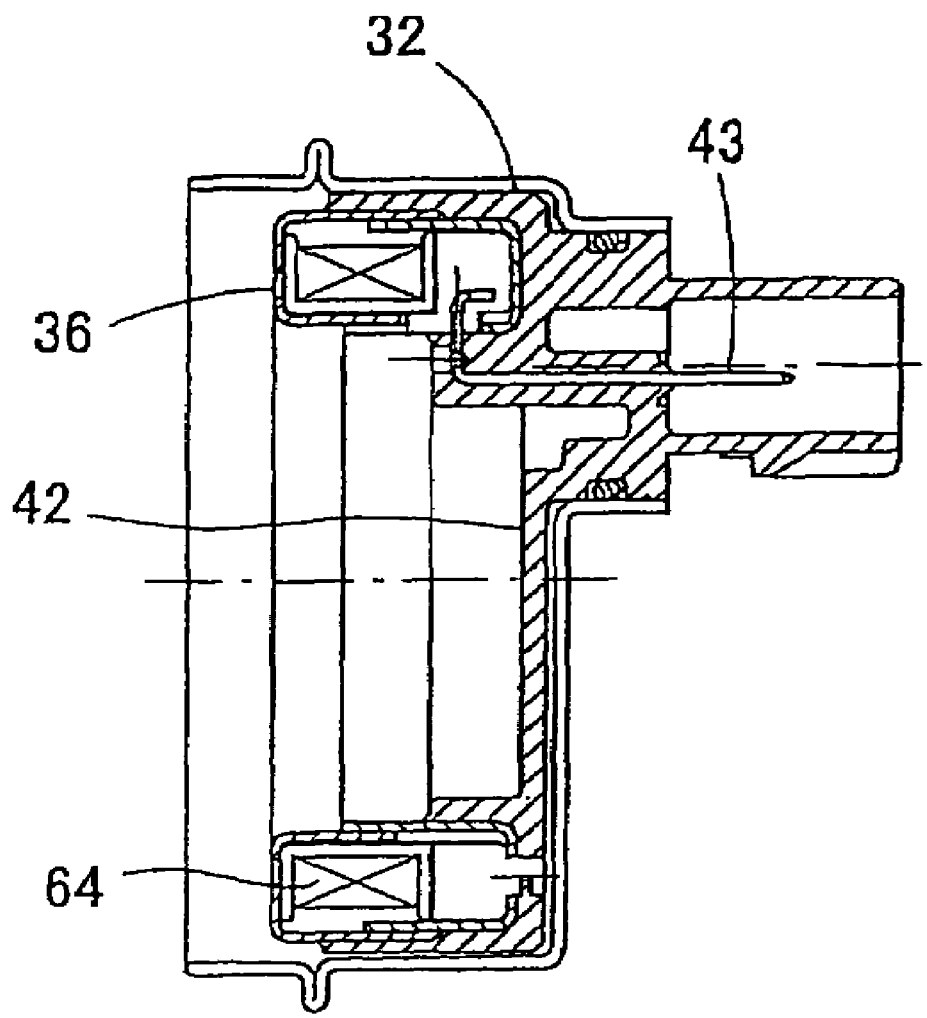
Fig. 11-- Prior Art

Fig. 12 -- Prior Art
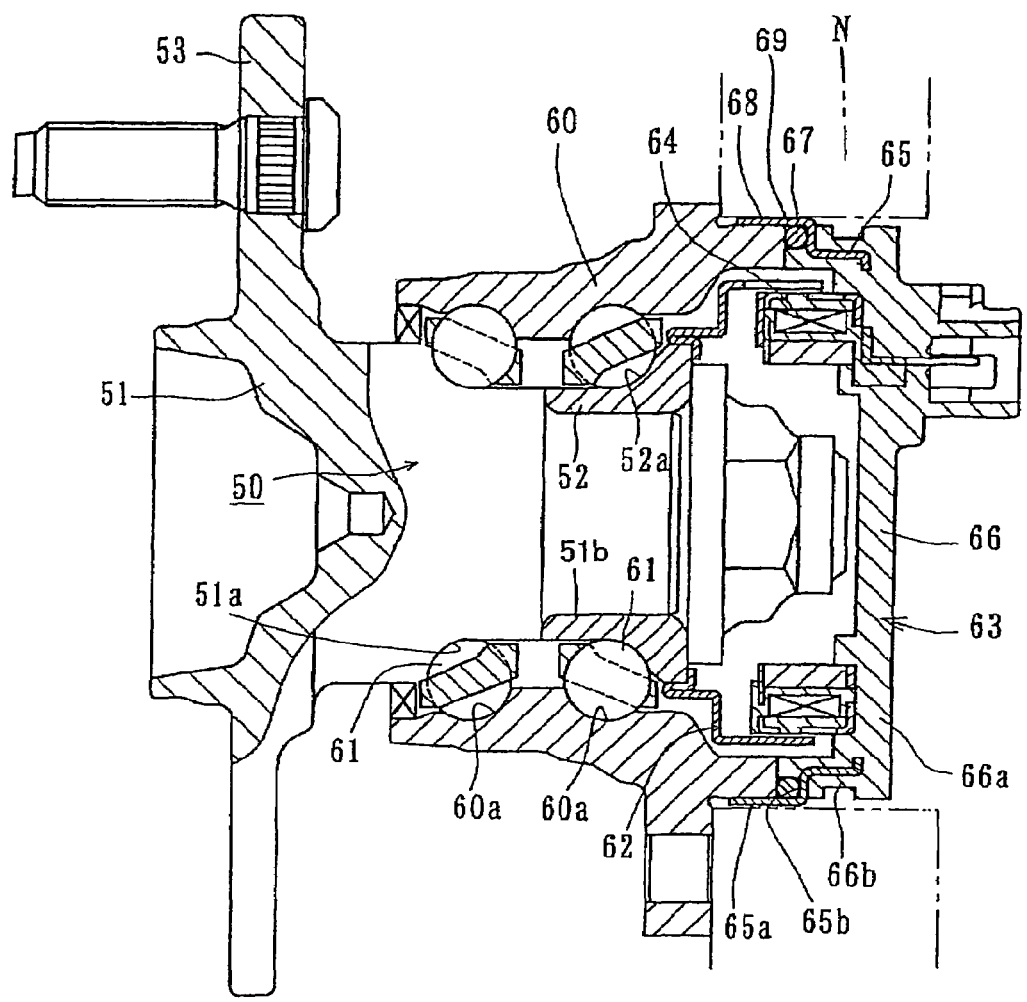

BEARING ASSEMBLY HAVING ROTATION SENSOR AND MOUNTING STRUCTURE TO SUPPORT SENSOR CAP AND CONNECTOR

CROSS REFERENCE TO RELATED APPLICATION

This application is base on International Application PCT/JP2005/016321 filed Sep. 6, 2005 and Japanese Application Nos. 2004-268211 filed Sep. 15, 2004 and 2004-325197 filed Nov. 9, 2004, the disclosures of which are hereby incorporated herein by reference.

FIELD OF THE INVENTION

The present invention relates to a bearing assembly having a rotation sensor incorporated therein, which assembly is of a type that can be used as, for example, a wheel support bearing for rotatably supporting wheels relative to a suspension system of, for example, an automotive vehicle equipped with an anti-lock brake system or a bearing for any other machines and equipments and, more particularly, to a mounting structure in the bearing assembly for supporting a sensor cap and a sensor connector.

BACKGROUND ART

The anti-lock brake system (ABS) is designed to detect the occurrence of tires being locked during run on a low friction road surface or at the time of panicked braking so that the braking can be relieved to secure a tire grip to improve the maneuvering stability. An ABS sensor for detecting the occurrence of the tire being locked is incorporated in a wheel support bearing assembly.

As such a passive type ABS sensor used in the wheel support bearing assembly, an annular type rotation sensor has been suggested (See, for example, the JP Laid-open Patent Publications No. 5-264562 and No. 8-285879.). This annular type rotation sensor includes a magnetic encoder having a multipolar magnet, and a magnetic sensor having a coil built therein in face-to-face relation with the multipolar magnet and is so operable that when magnetic fluxes passing the magnetic sensor as a result of rotation of the magnetic encoder change, an electric voltage can be induced across the coil to detect the rotation of a vehicle wheel.

Also, as shown in FIG. 10, it is suggested that the magnetic sensor 36 of the structure described above is resin molded together with a connector pin 43 to form a generally cylindrical sensor connector 42, which is in turn press-fitted into a generally cylindrical sensor cap 32 having a bottom surface. This is so designed that as shown in FIG. 11, when the sensor connector 42 is incorporated in the sensor cap 32 and the sensor cap 32 is then press-fitted into a stationary raceway member of the wheel support bearing assembly, the magnetic sensor 36 can be fixed in position in the stationary raceway member through the sensor cap 32. In such case, the magnetic encoder is fixed on a rotatable raceway member of the wheel support bearing assembly in face-to-face relation with the magnetic sensor 36.

In addition, as the wheel support bearing assembly having the rotation sensor built therein, what is shown in FIG. 12 is also available (See, for example, the JP Laid-open Patent Publication No. 9-329611.).

This wheel support bearing assembly with the rotation sensor includes an outer member 60 having an inner periphery formed with double rows of outer raceway surfaces 60a and 60a and serving as a stationary member, an inner member 50 having an outer periphery formed with double rows of inner raceway surfaces 51a and 52a opposed respectively to the outer raceway surfaces 60a and 60a and serving as a rotatable raceway member, double rows of rolling elements (balls) 61 rotatably interposed between the raceway surfaces 60a and 51a and between the raceway surfaces 60a and 52a, an annular tone wheel or encoder wheel 62 fixed on the inner member 50 and having characteristics alternately and equidistantly changing in a circumferential direction thereof, a cover 63 fixed to an inboard open end of the outer member 60, an annular rotation sensor 64 opposed to the tone wheel 62, and a sensor cap 65 fixed to a peripheral surface of an open end of the cover 63. The cover 63 is fixed to the outer member 60 with one peripheral surface of the sensor cap 65 press-fitted into an outer peripheral surface of one end of the outer member 60.

The inner member 50 has one end formed integrally with a wheel mounting flange 53 for the support of a vehicle wheel (not shown) and is made up of a hub axle 51 formed with the inner raceway surface 51a on the outer periphery thereof and a reduced diameter stepped portion 51b axially extending from the inner raceway surface 51a, and an inner race 52 mounted on the reduced diameter stepped portion 51b and formed with the inner raceway surface 52a on the outer periphery thereof.

The cover 63 is made up of a sensor connector 66 made of a synthetic resin and the sensor cap 65 made of a metallic material, and the sensor connector 66 includes a disc portion 66a and a cylindrical portion 66b extending axially from the disc portion 66a. The rotation sensor 64 formed to represent an annular shape is supported embedded on an outer surface side of the disc portion 66a. The cylindrical portion 66b has a free end formed with a recessed groove 67 that extends over the entire circumference thereof and is defined between an large diameter portion 65a and a stepped portion 65b of the sensor cap 65, and a seal ring such as an O-ring 69 is engaged inside the recessed groove 67. In this construction, the cover 63 can be removably mounted on the outer member 60 without impairing the sensor connector 66 made of the synthetic resin and forming a part of the cover 63 while preventing water from flowing into the outer member 60.

However, in the structure shown in FIGS. 10 and 11, the sensor connector 42 has an outer periphery press-fitted into the inner periphery of the sensor cap 32 with a predetermined allowance therebetween and the end of the sensor connector 42 is held in abutment with a bottom surface of the sensor cap 32 to complete assemblage of the sensor connector 42 with the sensor cap 32. Because of this, depending on the diametric dimension of the outer periphery of the sensor connector 42 and/or the diametric dimension of the inner periphery of the sensor cap 32, the press-fitting allowance varies considerably and, as a result, a press-fitting load changes, resulting in difficulty in assemblage.

Also, the sensor connector 42 is axially positioned relative to the sensor cap 32 by abutting the end of the sensor connector 42 with the bottom surface of the sensor cap 32 and, therefore, when the necessity arises to perform a fine adjustment of the axial position of the sensor connector 42 in order to increase the accuracy of an output signal of the rotation sensor 64, it often occurs that the fine adjustment to be carried out by pressing the sensor connector 42 deep into the sensor cap 32 cannot be performed easily.

On the other hand, in the rotation sensor incorporated wheel support bearing assembly shown in FIG. 12, a mounting gap of 20 to 100 μm is present between a knuckle N, forming a part of the suspension system, and a pilot portion 68 of the outer member 60 (which is the large diameter portion 65a of the sensor cap 65 in the instance shown) and, therefore, there is a high possibility that salty water and/or dusts may ingress into the gap and rusting may eventually occur accordingly. Once the pilot portion 68 rusts, removal of the outer member 60 from the knuckle N would be difficult to achieve.

In addition, in view of the fact that the seal ring such as the O-ring 69 is engaged in the recessed groove 67 formed in the free end of the cylindrical portion 66b of the sensor connector 66 forming a part of the cover 63, it is possible to avoid an ingress of water inside the outer member 60, but there is the risk that once the pilot portion 68 rusts, the cover 63 is axially displaced by the effect of a volume expansion of the rust, resulting in a disorder of the positional relation between the rotation sensor 64 and the tone wheel 62. Once this positional relation disorders, the accuracy of the output signal of the rotation sensor 64 is impaired and depending on a situation the output signal will fail to emerge.

DISCLOSURE OF THE INVENTION

An object of the present invention is to provide a rotation sensor incorporated bearing assembly, capable of outputting a signal for a substantial period of time accurately and stably.

A bearing assembly with a rotation sensor according to a first construction of the present invention includes an outer member having an inner periphery formed with a raceway surface, an inner member having an outer periphery formed with a raceway surface opposed to the raceway surface of the outer member, a plurality of rolling elements interposed between the opposed raceway surfaces and a rotation sensor. The rotation sensor includes an annular magnetic encoder provided on an outer periphery of one end of the inner member and having a magnetic characteristic varying in a circumferential direction, and an annular magnetic sensor fitted to the outer member through a sensor cap and a sensor connector and held in face-to-face relation with the magnetic encoder. The sensor cap is formed to represent a cylindrical shape having a bottom surface and has an opening end mounted on the inner periphery or an outer periphery of the outer member. The sensor connector is provided integrally with the annular magnetic sensor, has a polygonal outer periphery and is press-fitted in an inner periphery of the sensor cap. The number of angled portions of the polygonal shape of the sensor connector may be, for example, six, a factor of ten or a factor of some tens. Also, the angled portions of the polygonal shape may be of a rounded sectional shape.

According to the first construction, the sensor cap is rendered to be of a cylindrical shape in order to facilitate mounting of the sensor cap onto the outer member. Since the sensor connector engaged by press-fitting into the inner periphery of the cylindrical sensor cap has its outer periphery that is rendered to be of a polygonal shape, even though there is a variation in the inner diametric dimension of the sensor cap and/or the outer diametric dimension of the sensor connector, the press-fitting allowance of the sensor cap and the sensor connector relative to each other can be minimized as a whole and, accordingly, the pres-fitting load can be minimized correspondingly. As a result, the engagement by press-fitting of the sensor connector into the sensor cap can be accomplished easily.

In this first construction, an end face of the sensor connector, which confronts with the bottom surface of the sensor cap may be provided with a projection held in abutment with the bottom surface of the sensor cap. The provision of the projection can facilitate determination of the position to which the sensor connector can be advanced into the sensor cap.

The projection is preferably plastically deformed in a crushed state by an effect of a load induced when pressed against the bottom surface of the sensor cap in a condition, in which the sensor connector is press-fitted into the sensor cap.

In such case, when a pushing load is applied even after the projection is brought into abutment with the bottom surface of the sensor cap, the projection can be crushed with such load and can therefore be pushed deep into the sensor cap. Because of this, while the position to which the sensor connector is advanced inside the sensor cap is regulated by the projection, the sensor can be strongly pushed deeper into the sensor cap should a fine adjustment is required in axial positioning of the sensor connector, thereby facilitating such fine adjustment.

In the first construction, the magnetic sensor may be a magnetic ring having a coil built therein. The use of the magnetic ring having the coil built therein is effective to allow an electromotive force to be generated across the coil as the magnetic encoder rotates. Hence, the magnetic sensor can be rendered to be a passive type magnetic sensor that does not require the supply of an electric power for accomplishing a detecting operation.

In the first construction, each of the outer member and the inner member may have double rows of the raceway surfaces and the bearing assembly may be a wheel support bearing assembly for rotatably supporting a vehicle wheel relative to a vehicle body. In the case of this construction, fitting of the rotation sensor to the wheel support bearing assembly can be accomplished easily.

A wheel support bearing assembly with a rotation sensor according to a second construction of the present invention includes an outer member inserted in a knuckle forming a part of a suspension system and having an inner periphery formed with double rows of outer raceway surfaces, an inner member made up of a hub axle, having one end formed integrally with a wheel mounting flange and having an outer periphery formed with a reduced diameter stepped portion extending axially from the wheel mounting flange, and an inner race press-fitted onto the reduced diameter stepped portion of the hub axle, said inner member having an outer periphery formed with double rows of inner raceway surfaces opposed respectively to the double rows of the outer raceway surfaces of the outer member, double rows of rolling elements accommodated rotatably between the inner member and the outer member, a cover closing an opening of the outer member on one end thereof and having a sensor connector, formed to represent a cap-like shape and made of a synthetic resin, and a sensor cap made of a metallic material, a pulsar ring mounted on the inner race, and a rotation sensor opposed to the pulsar ring and embedded in the sensor connector. The cover is formed from a steel plate, having a rust resistance, by means of a press-work to represent the cap-like shape and extends over an outer surface of the sensor connector so as to cover the sensor connector. A cylindrical portion of the cover is mounted in an inner peripheral surface of one end of the outer member, which end forms a pilot portion for the knuckle. The cylindrical portion of the cover has an outer periphery provided with an annular elastic member held in contact with an inner peripheral surface of the knuckle.

As described above, since the cover is prepared from a rust-resistant steel plate by the use of a press work to represent a cap-like shape so as to cover the sensor connector and has the cylindrical portion mounted in the inner peripheral surface of one end of the outer member, which end serves as a pilot portion for the knuckle. The cylindrical portion of the cover has an outer periphery provided with the annular elastic member that is held in contact with the inner peripheral surface of the knuckle, not only can the sensor connector, made of the synthetic resin, be prevented from deteriorating under a severe environment full of muddy salt water for a long period of time, but an undesirable ingress of muddy salt water and/or dusts from the pilot portion can also be avoided, making it possible to provide the rotation sensor incorporated bearing assembly, in which the sealability of the pilot portion of the outer member and the sealability between the pilot portion and the knuckle.

Also, in this second construction, if the cylindrical portion of the cover is formed with an annular groove and the elastic member is engaged in this annular groove, an undesirable ingress of the muddy salt water and/or dusts into the bearing assembly through the pilot portion can be prevented with a simplified structure.

Preferably, in the second construction, if the cylindrical portion of the cover has a mounting area, adapted to be mounted in the outer member, and a collar that is formed by bending the cylindrical portion in a radially outward direction of the bearing assembly and then turning it backward in an overlapped fashion, the positioning of the cover relative to the outer member can be easily accomplished and, therefore, not only can press-fitting of the cover be simplified, but also an accurate air gap adjustment between the rotation sensor and the pulsar ring can also be accomplished.

Also, in the second construction, if the collar is integrally bonded with an elastic member having a lip, the sealability between the cover and the knuckle can be increased and the assembling work can be simplified.

Again, in the second construction, since the pulsar ring includes a cylindrical portion mounted on the outer periphery of the inner race, an upright portion extending radially outwardly from the cylindrical portion, and a magnetic encoder integrally bonded to a side face of the upright portion, made of an elastomer mixed with a powder of ferromagnetic material such as ferrite and magnetized to have circumferentially alternating magnetic poles N and S, and an outer diametric edge of the upright portion is held in face-to-face relation with the cylindrical portion of the cover with a slight radial gap formed therebetween to define a labyrinth seal, not only can the accurate detection be obtained at a low cost, but also a leakage of the lubricant grease, filled inside the bearing, into the cover can be avoided and, accordingly, the durability of the bearing can be maintained for a long period of time.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is an explanatory diagram showing the conventional method of press-fitting of the sensor connector into the sensor cap;

FIG. 11 is a sectional view showing the manner in which the sensor connector is press-fitted into the sensor cap in the conventional art; and FIG. 12 is a longitudinal sectional view showing the conventional rotation sensor incorporated bearing assembly.

BEST MODE FOR CARRYING OUT THE INVENTION

Figure 1:
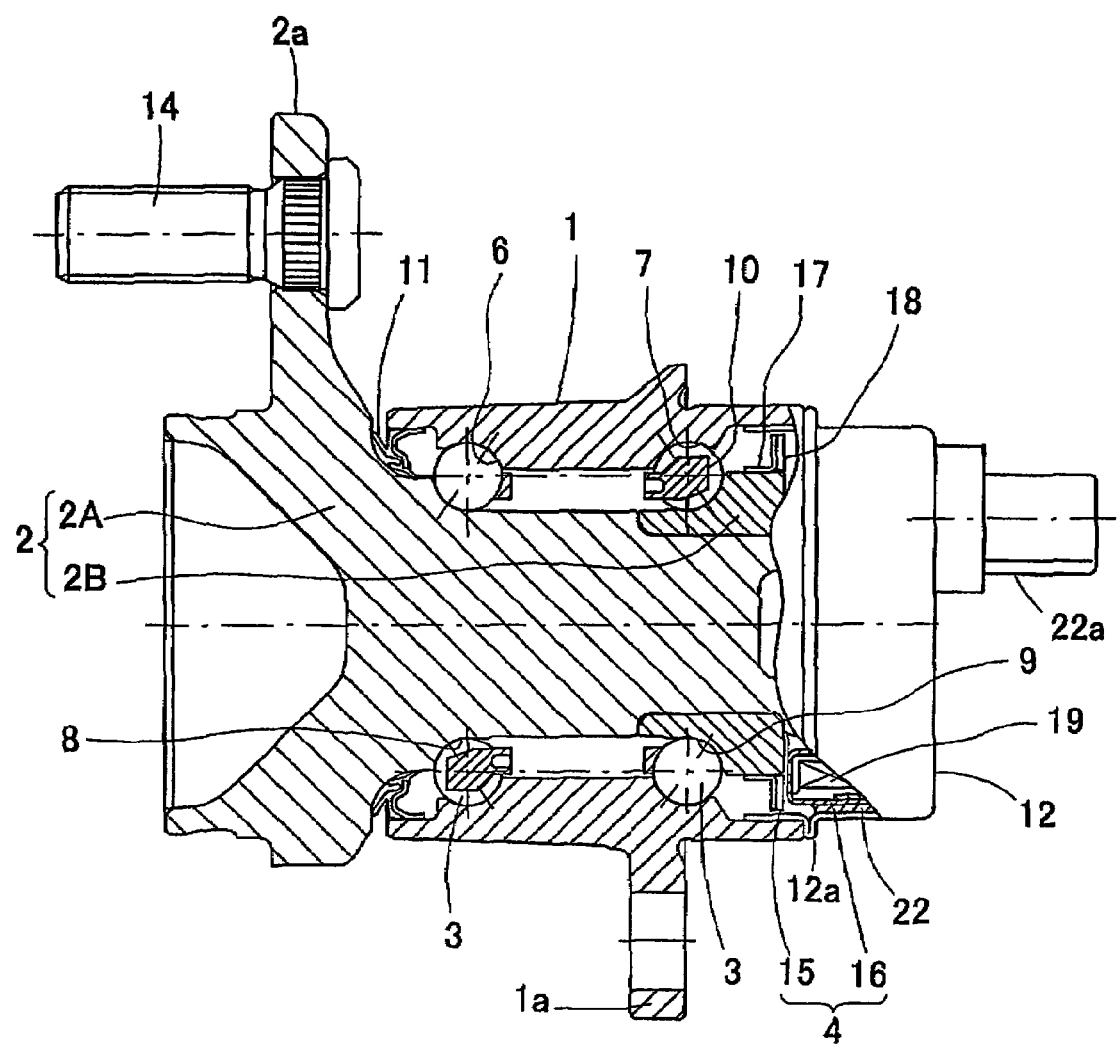
FIG. 1 is a sectional view of a rotation sensor incorporated bearing assembly according to a first preferred embodiment of the present invention.

A first preferred embodiment of the present invention will be described with reference to FIGS. 1 to 5. This embodiment is directed to a third generation type bearing assembly of an inner race rotating model for the support of a driven wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively. In FIG. 1, a left portion represents the outboard side and a right portion represents the inboard side. This rotation sensor incorporated bearing assembly includes an outer member 1 having an inner periphery formed with double rows of raceway surfaces 6 and 7, an inner member 2 having an outer periphery formed with double rows of raceway surfaces 8 and 9 opposed respectively to the raceway surfaces 6 and 7, and double rows of rolling elements 3 interposed between the raceway surfaces 6 and 8 and between the raceway surfaces 7 and 9. The outer member 1 has one end formed with a vehicle body fitting flange 1a. The outer member 1 is fitted to, for example, a knuckle (not shown) of an automotive vehicle body through the vehicle body fitting flange 1a.

The inner member 2 has a wheel mounting flange 2a, to which an automotive vehicle wheel (not shown) is fitted by means of bolts 14. This bearing assembly is rendered to be a double row angular contact ball bearing with respective contact angles of the raceway surfaces 6 to 9 held in back-to-back relation with each other. The rolling elements 3 are retained by a retainer 10 for each row. An annular bearing space delimited between the outer member 1 and the inner member 2 has an outboard open end on the outside of the outboard rolling elements 3 sealed by a sealing member 11.

The inner member 2 is made up of a hub axle 2A having the wheel mounting flange 2a formed integrally with the hub axle 2A, and an inner race 2B which is a member separate from the hub axle 2A and mounted on an outer periphery of an inboard end of the hub axle 2A, with the inner race 2B fixed axially by means of crimping of the inboard end of the hub axle 2A. The double rows of the raceway surfaces 8 and 9 are formed in the hub axle 2A and the inner race 2B, respectively.

The outer member 1 is fitted with a sensor cap 12 covering an entire inboard end of the bearing assembly, and a rotation sensor 4 capable of generating electricity as a result of a relative rotation between the outer member 1 and the inner member 2 is arranged inwardly of the sensor cap 12. By this sensor cap 12, an ingress of water from the outside into the bearing assembly is prevented.

Figure 2:
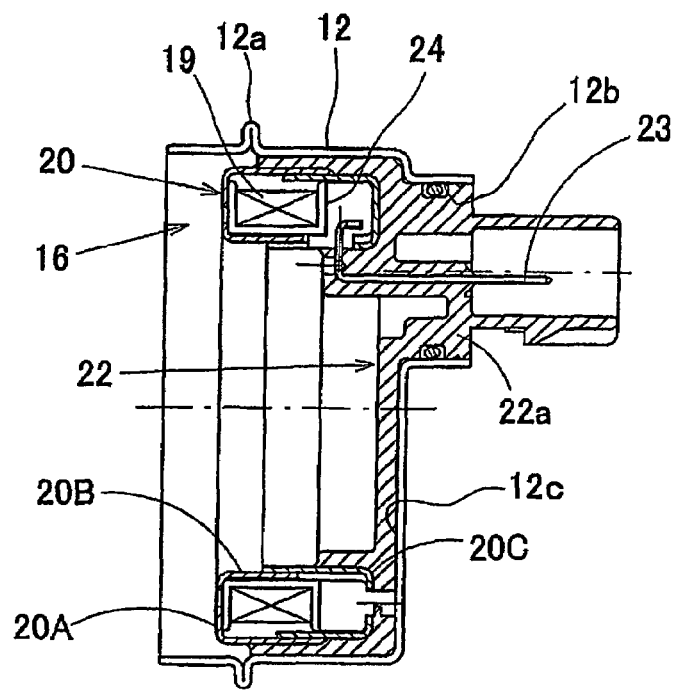
FIG. 2 is a longitudinal sectional view showing a support structure for a magnetic sensor of the rotation sensor thereof.

As shown in FIG. 2, the sensor cap 12 is of a cylindrical configuration having a collar 12a protruding from an outer peripheral surface in an outer diametric direction and has one end rendered to be a bottom surface 12c excluding a connector protruding hole 12b. This sensor cap 12 has an opening end mounted on an inner peripheral surface of the outer member 1 by pressing the collar 12a axially with a jig and, at the same time, is fitted to the outer member 1 by pressing the collar 12a against an inboard end face of the outer member 1. A side face of the cap collar 12a is rendered to be a flat face in order to be held in tight contact with the end face of the outer member 1.

It is to be noted that fitting of the sensor cap 12 to the outer member 1 may be carried out by mounting the opening end of the sensor cap 12 on the outer peripheral surface of the outer member 1.

The rotation sensor 4 is of an annular type and includes a magnetic encoder 15 having a multipolar magnet 18 and a magnetic sensor 16 in the form of a magnetic ring having a coil 19 built in a magnetic yoke 20. This rotation sensor 4 is of an axial type, in which the magnetic sensor 16 axially confronts with the multipolar magnet 18 of the magnetic encoder 15.

Figure 5:
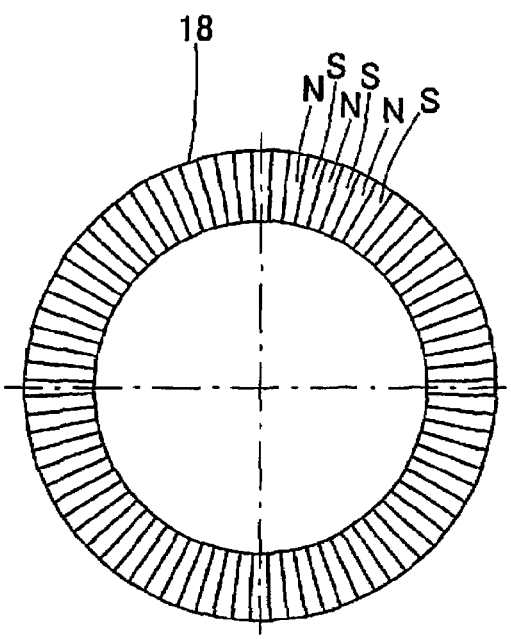
FIG. 5 is a front elevational view of a multipolar magnet employed in a magnetic encoder.

The magnetic encoder 15 includes an annular core metal 17 made of a metallic material and the multipolar magnet 18 provided on a circumferential surface of the core metal 17. The multipolar magnet 18 is in the form of a disc having a plurality of magnetic poles N and S arranged in a circumferential direction so as to alternate with each other at intervals of a predetermined pitch as shown in FIG. 5. The core metal 17 is of an L-sectioned annular configuration including a cylindrical portion and an upright portion extending radially outwardly from one end of the cylindrical portion. The multipolar magnet 18 is in the form of a ring-shaped rubber magnet and is bonded by vulcanization to a side face of the upright portion of the core metal 17, which confronts towards the inboard side of the bearing assembly. The multipolar magnet 18 may be employed in the form of a plastic magnet or a sintered magnet. Also, for the multipolar magnet 18, a ferrite or a rare earth magnet of, for example, Nd system or SmFe system may be employed.

The magnetic yoke 20 of the magnetic sensor 16 is, as shown in FIG. 2, in the form of a ring body of a generally squared sectional shape formed by engaging two ring-shaped members 20A and 20B of an L-sectioned configuration with one ring-shaped member 20C of a grooved sectional shape opening axially. In other words, an outer diametric portion of the ring-shaped member 20A and an outer diametric portion of the ring-shaped member 20C are engaged one inside the other with no gap formed therebetween and, on the other hand, an inner diametric portion of the ring-shaped member 20B and an inner diametric portion of the ring-shaped member 20C are engaged one inside the other with no gap formed therebetween, thereby forming the ring body having the generally squared sectional shape. With the magnetic yoke 20 so formed in this way, the magnetic resistance at the engaged portions in a magnetic circuit inside the magnetic yoke 20 can be minimized.

Figure 3:
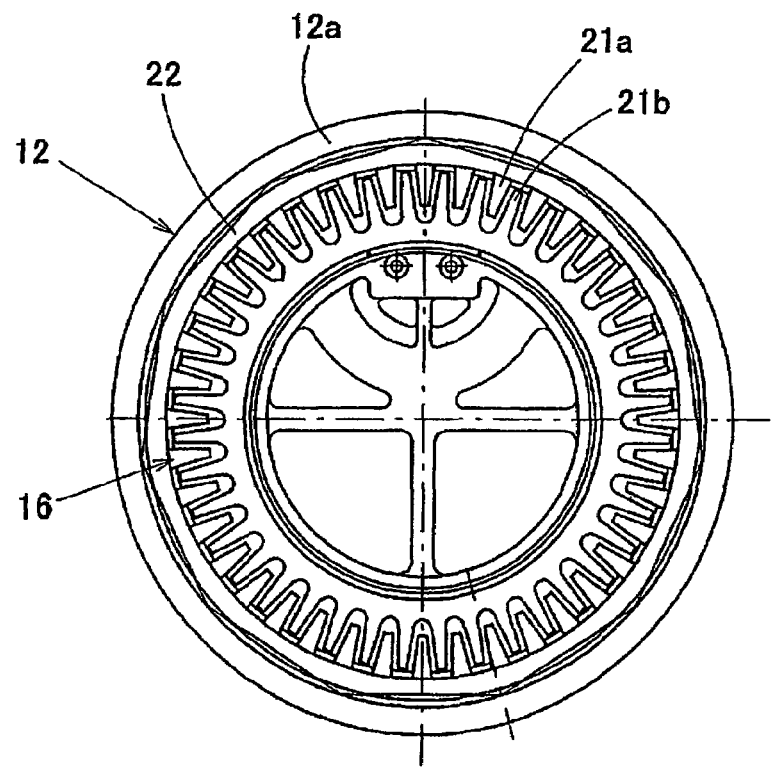
FIG. 3 is a front elevational view of the support structure for the magnetic sensor.

Respective side faces of the two ring-shaped members 20A and 20B, which confront the multipolar magnet 18 are, as shown in FIG. 3, formed with comb-shaped pawls 21a and 21b so oriented as to extend in a radial direction while confronting with each other. The pawls 21a and 21b of those two sets are arranged so as to alternate with each other in a circumferential direction with a gap defined between the neighboring pawls 21a and 21b, at intervals of a pitch equal to the pitch of the magnetic poles N and S of the multipolar magnet 18 held in face-to-face relation with the ring-shaped members 20A and 20B. Since each of the pawls 21a and 21b extends from one peripheral edge towards the opposite peripheral edge, the area of surface of the pawls 21a and 21b confronting the magnetic poles N and S of the multipolar magnet 18 can be increased and, hence, the magnetic fluxes that can be guided towards the magnetic yoke 20 can be increased.

Also, the magnetic yoke 20 has a metallic connector pin 23 extending from an interior thereof towards the outside with a coil of the magnetic yoke 20 connected to an inner end of the connector pin 23. This connector pin 23, after having been bent outside of the magnetic yoke 20, extends axially. The coil 19 within the magnetic yoke 20 is wound around a coil bobbin 24.

The sensor connector 22 is insert molded, using a resin, together with the magnetic sensor 16 and the connector pin 23. A portion of the sensor connector 22 covering an extension of the connector pin 23 is rendered to be a coupling portion 22a so engaged in the connector protruding hole 12b in the sensor cap 12 as to extend outwardly of the sensor cap 12. This coupling portion 22a is connected to an external connector (not shown) and a signal from the magnetic sensor 16 is outputted to the outside.

Figure 4A:
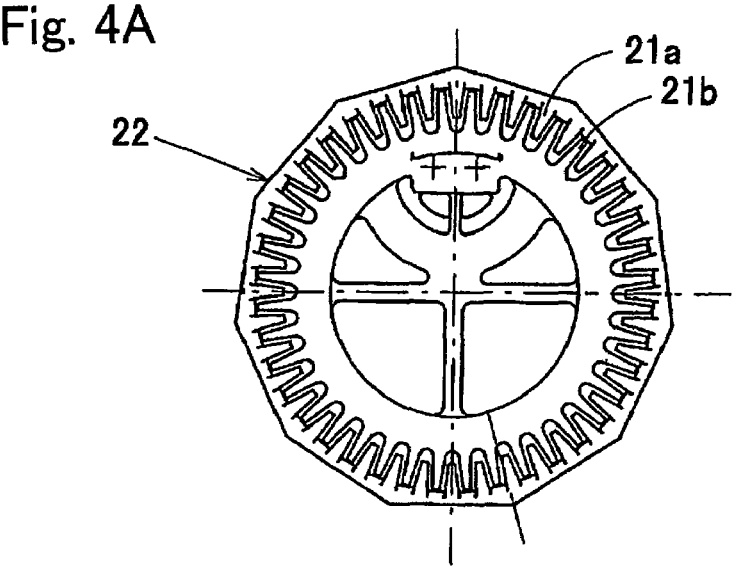
FIG. 4A is a front elevational view of a sensor connector having the magnetic sensor provided integrally therein.
Figure 4B:
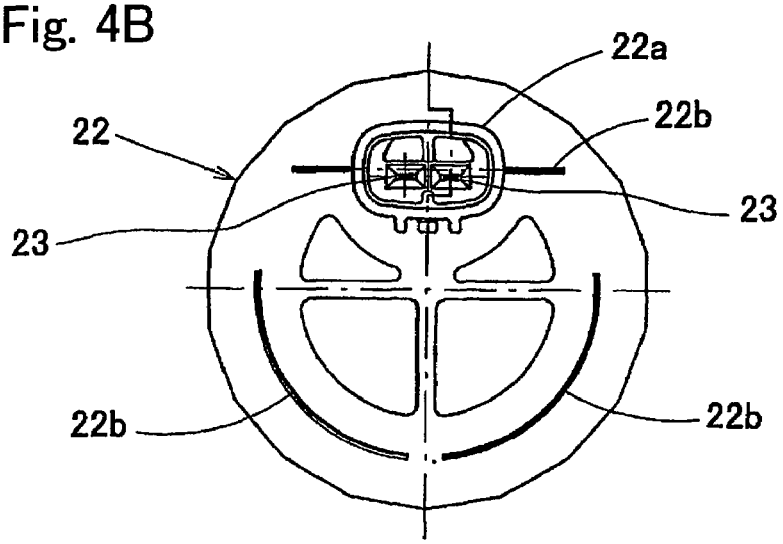
FIG. 4B is a rear view of the sensor connector.
Figure 4C:
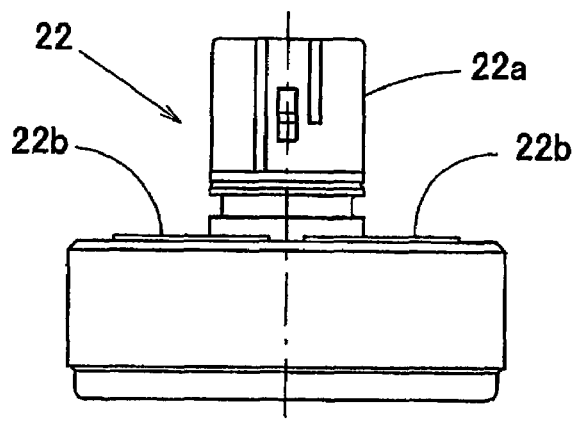
FIG. 4C is a bottom plan view of the sensor connector.

The sensor connector 22 has an outer periphery representing a polygonal shape as shown in a front elevational view in FIG. 4A and is press-fitted into the inner periphery of the sensor cap 12 as shown in FIGS. 2 and 3. An end face of the sensor connector 22, which confronts the bottom surface 12c of the sensor cap 12, is provided with a projection 22b engaged with the bottom surface 12c as shown in a rear view and a bottom plan view in FIGS. 4B and 4C, respectively. This projection 22b is capable of being plastically deformed in a crushed state by the effect of a load induced when pressed against the bottom surface 12c while the sensor connector 22 has been press-fitted in the sensor cap 12.

Fitting of the sensor cap 12 to the outer member 1 is carried out while the sensor connector 22 has been press-fitted into the sensor cap 12 as shown in FIGS. 2 and 3. In this way, the magnetic sensor 16 is fitted to the outer member 1 through the sensor cap 12 and the sensor connector 22, so as to confront axially with the multipolar magnet 18 of the magnetic encoder 15 fitted to the inner member 2.

The operation of the rotation sensor 4 of the above described structure will now be described. When the inner member 2, to which the magnetic encoder 15 of the rotation sensor 4 is fitted, rotates together with the automotive vehicle wheel, by the effect of the relative rotation between the magnetic encoder 15 and the magnetic sensor 16, a voltage of a frequency proportional to the number of revolutions of the vehicle wheel is induced in the coil 19 of the magnetic sensor 16 and this voltage is outputted from the magnetic sensor 16 as a rotation signal. The output is led to the outside through the connector pin 23 of the sensor connector 22.

In this rotation sensor incorporated bearing assembly, since the sensor connector 22, which is engaged in the inner periphery of the cylindrical sensor cap 12, has its outer periphery representing a polygonal shape, the press-fitting allowance of the sensor connector 22 and the sensor cap 12 relative to each other can be minimized as a whole even though there is a variation in the inner diametric dimension of the sensor cap 12 and/or the outer diametric dimension of the sensor connector 22, and, accordingly, the press-fitting load can be minimized correspondingly. As a result, the engagement by press-fitting of the sensor connector 22 into the sensor cap 12 can be accomplished easily. Accordingly, mounting of the rotation sensor 4 in the wheel support bearing assembly can be accomplished easily.

The axial positioning of the sensor connector 22 relative to the sensor cap 12 can be accomplished by press-fitting the sensor connector 22 into the sensor cap 12 until one end face of the sensor connector 22 is brought into contact with the bottom surface 12c of the sensor cap 12. Since the projection 22b held in abutment with the bottom surface 12c is provided in the end face of the sensor connector 22, which confronts the bottom surface 12c, a tentative positioning of the sensor connector 22 relative to the sensor cap 12 can be accomplished when this projection 22b engages the bottom surface 12c.

However, when a pressing load is applied to the sensor connector 22 even after the projection 22b is brought in abutment with the bottom surface 12b of the sensor cap 12, the projection 22b can be deformed by the load, allowing the sensor connector 22 to be pressed deeper into the sensor cap 12. Because of this, while carrying out the temporal positioning of the sensor connector 22 with the projection 22b, where a fine adjustment is required, this fine adjustment of the positioning can easily be accomplished by strongly pushing the sensor connector 22 into the sensor cap 12 in order to increase the accuracy of the output signal of the magnetic sensor 16.

It is to be noted that although the first embodiment has been described as applied to the wheel support bearing assembly, the present invention can be equally applied to a rolling bearing in general such as a deep groove ball bearing.

Hereinafter, a second preferred embodiment of the present invention will be described with reference to the accompanying drawings.

Figure 6:
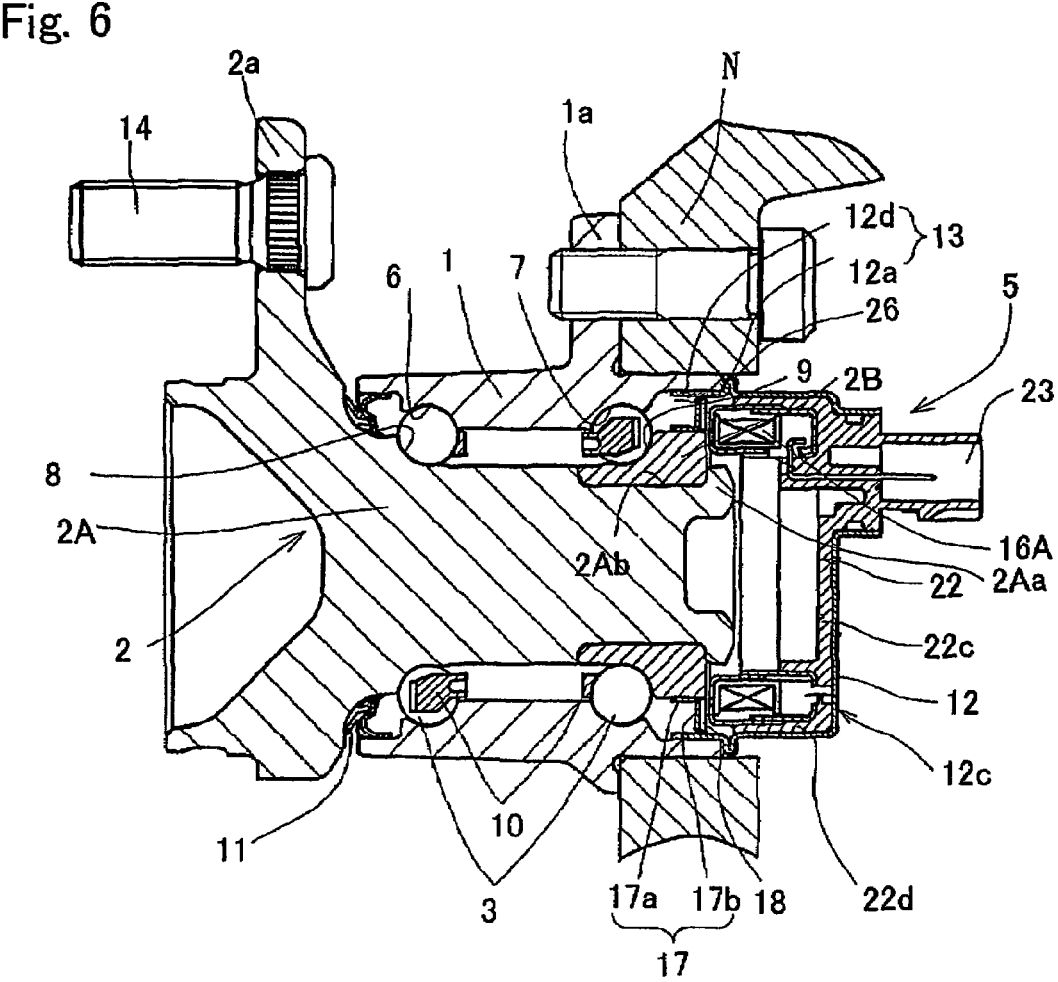
FIG. 6 is a longitudinal sectional view of the rotation sensor incorporated bearing assembly according to a second preferred embodiment of the present invention.
Figure 7:
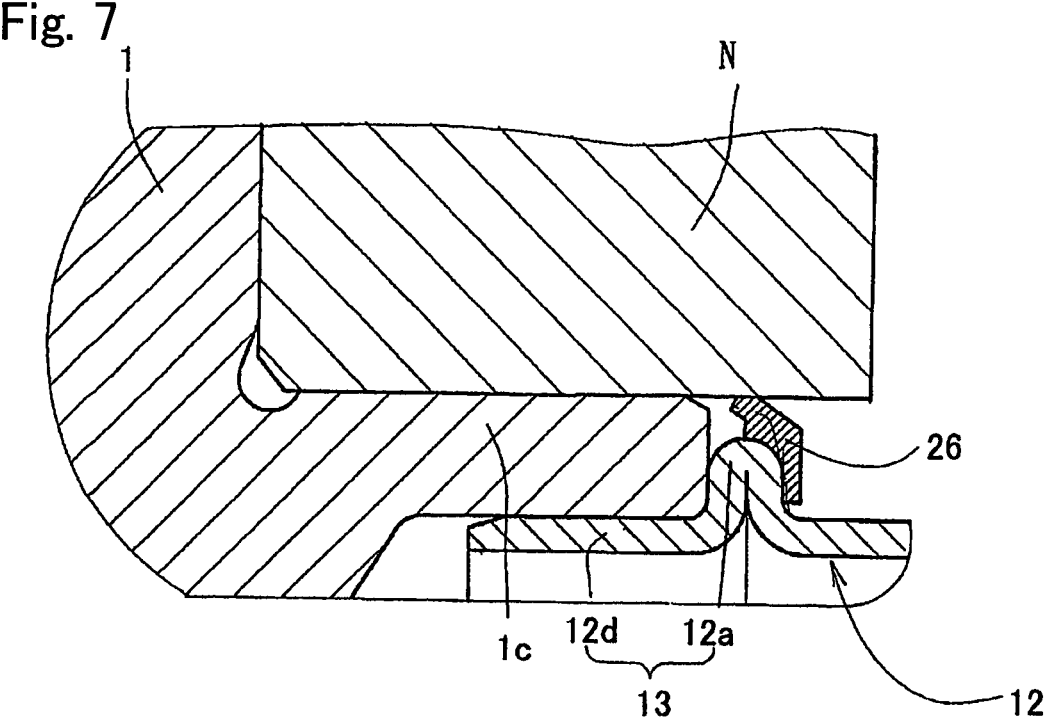
FIG. 7 is an enlarged view of an important portion of FIG. 6.
Figure 8:
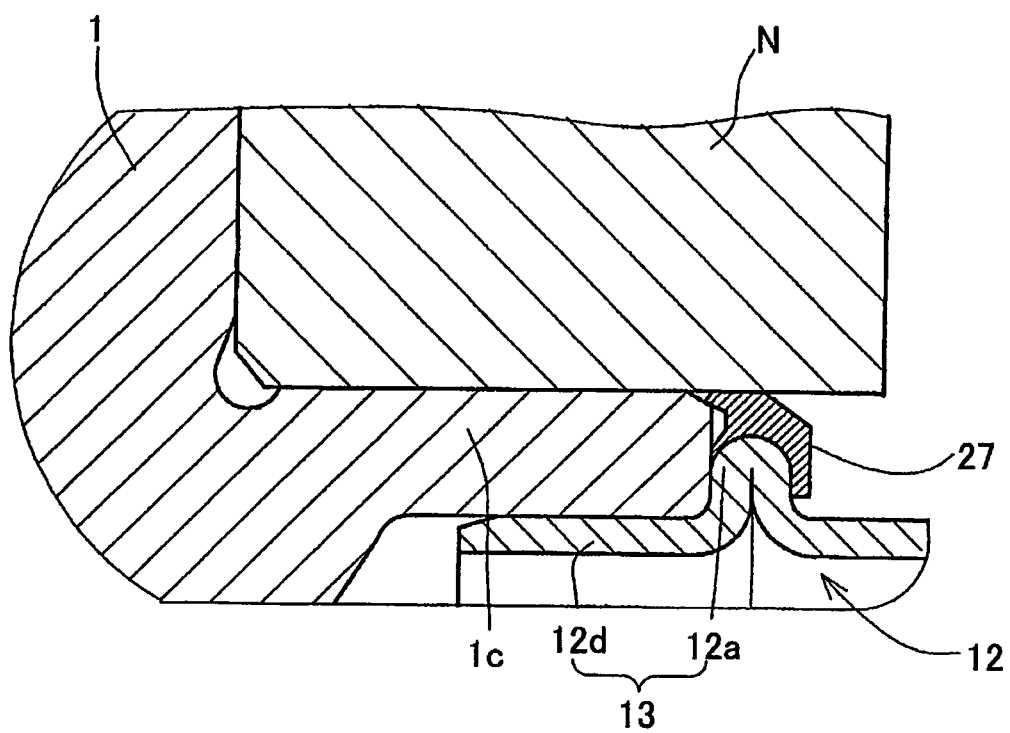
FIG. 8 is an enlarged view showing a modification of FIG. 7.

FIG. 6 is a longitudinal sectional view of the rotation sensor incorporated bearing assembly according to the second preferred embodiment of the present invention, FIG. 7 is an enlarged view of an important portion of FIG. 6, and FIG. 8 is an enlarged view showing a modification of FIG. 7.

This rotation sensor incorporated bearing assembly includes an inner member 2, an outer member 1 and double rows of rolling elements (balls) 3 and 3 accommodated between those members 2 and 1. The inner member 2 is made up of a hub axle 2A and an inner race 2B which is a member separate from the hub axle 2A and mounted on this hub axle 2A.

The hub axle 2A has one end formed with a wheel mounting flange 2a, to which an automotive vehicle wheel (not shown) is fitted by means of hub bolts 14 circumferentially equidistantly implanted in this wheel mounting flange 2a for the securement of the vehicle wheel. The hub axle 2A has an outer periphery formed with an inner raceway surface 8 and a reduced diameter stepped portion 2Ab extending axially from this inner raceway surface 8. The inner race 2B formed with an inner raceway surface 9 is press-fitted onto this reduced diameter stepped portion 2Ab and is fixed axially to the hub axle 2A by means of a crimped portion 2Aa formed by plastically deforming one end of the reduced diameter stepped portion 2Ab in a radially outward direction. In the second embodiment, owing to the use of such a self-retaining structure in which the inner race 2B is firmly retained by the crimped portion 2Aa, there is no need to control the amount of a preload by firmly fastening the inner race 2B relative to the hub axle 2A with nuts or the like such as experienced in the conventional art and, therefore, not only can incorporation of the bearing assembly into the automotive vehicle be facilitated, but also the amount of the preload can be maintained for a substantial period of time. Also, it is possible to reduce the weight and the size of the inner member 2 with a projection of the hub axle 2A on the inboard side being minimized.

The outer member 1 has an outer periphery formed integrally with a vehicle fitting flange 1a which is fitted to a knuckle N and also has an inner periphery formed with double rows of outer raceway surfaces 6 and 7. The double rows of the outer raceway surfaces 6 and 7 are opposed respectively to the double rows of the inner raceway surfaces 8 and 9 formed integrally in the respective outer peripheries of the hub axle 2A and the inner race 2B. And, the double rows of the rolling elements 3 and 3 are accommodated between the raceway surfaces 6 and 8 and between the raceway surfaces 7 and 9 and those double rows of the rolling elements 3 and 3 are rollingly retained by respective retainers 10 and 10.

Also, a seal 11 and a cover 5 are mounted on opposite ends of the outer member 1 to prevent a lubricant grease, filled inside the bearing assembly, from leaking and also to prevent rain water and/or dusts from entering from the outside into the bearing. The bearing assembly having the above described structure is referred to as a third generation type wheel support bearing assembly. It is to be noted that although in the instance described above, the rolling elements 3 and 3 have been described as employed in the form of balls and a double row angular contact ball bearing has been exemplified, the present invention is not always limited thereto and it may be applied to a double row tapered roller bearing.

The hub axle 2A is made of a medium carbon steel such as, for example, S53C, containing 0.40 to 0.80 wt % of carbon and is hardened by means of an induction hardening technique, ranging from a seal land portion where the seal 11 contacts the hub axle 2A slidingly, the inner raceway surface 8 on the outboard side to the reduced diameter stepped portion 2Ab, so that the surface hardness of the hub axle 2A may fall within the range of 58 to 64 HRC. It is to be noted that the crimped portion 2Aa is left unhardened, having a surface harness of 25 HRC or lower of a raw material after forging. On the other hand, the inner race 2B is made of a high carbon chrome bearing steel such as SUJ2 and is hardened deep into a core thereof by means of a through hardening technique to have a hardness within the range of 58 to 64 HRC.

Also, the outer member 1 is made of a medium carbon steel, for example, S53C, containing 0.40 to 0.80 wt % of carbon and has the double rows of the outer raceway surfaces 6 and 7 hardened by means of an induction hardening technique to have a surface hardness within the range of 58 to 64 HRC.

A slinger 17 is press-fitted onto an outer peripheral surface of the inner race 2B. This slinger 17 is made of a ferromagnetic steel plate such as a ferritic stainless steel plate (SUS430 or the like according to the Japanese Industrial Standards) or a cold rolled steel plate treated to have a resistance to rusting (SPCC system or the like according to the Japanese Industrial Standards) and is press-worked to have a generally L-shaped section and is as a whole formed to represent an annular configuration including a cylindrical portion 17a and an upright portion 17b protruding radially outwardly from this cylindrical portion 17a. A magnetic encoder (a pulsar ring) 18 is bonded integrally by vulcanization to an inboard side face of the upright portion 17b.

This magnetic encoder 18, formed by mixing an elastomer such as rubber with a powder of ferromagnetic material such as ferrite, is magnetized to have circumferentially alternating magnetic poles N and S that are spaced at intervals of a predetermined pitch on the pitch circle diameter (PCD) and forms a rotary encoder for the detection of the rotational speed of the automotive vehicle wheel. It is to be noted that although in the instance now under discussion the magnetic encoder 18 has been exemplified as made of the elastomer, the present invention may not be always limited thereto and the magnetic encoder 18 may be made of, for example, a sintered metal, in which a powder of ferromagnetic material such as ferrite is caked with a metallic binder.

In the second embodiment described above, the cover 5 includes a sensor connector 22 made of a synthetic resin, and a sensor cap 12 made of a steel plate capped over the sensor connector 22 so as to cover an outer surface of the sensor connector 22 and is mounted on one end of the outer member 1 so as to close an opening of the outer member 1 on the inboard side. The sensor connector 22 is made of, for example, a synthetic resin of PA (polyamide) system such as Nylon 66, PPA (polyphthalamide) or PPS (polyphenylene sulfide) and is formed to have a cap-like shape including a bottom portion 22c and a cylindrical portion 22d. The bottom portion 22c has an outer diametric portion encasing a rotation sensor 16A, which is arranged so as to confront the magnetic encoder 18 with an axial gap (air gap) defined therebetween and a connector 23 for leading a detection signal of the rotation sensor 16A to the outside is formed integrally with the rotation sensor 16A.

When the magnetic encoder 18 rotates together with the inner race 2B as the vehicle wheel rotates, an output from the rotation sensor 16A held in face-to-face relation with the magnetic encoder 18 changes. The frequency of change of the output of the rotation sensor 16A is so proportional to the rotational speed of the vehicle wheel that if the output signal from the rotation sensor 16A is inputted to a controller (not shown), the ABS can be properly controlled.

The sensor cap 12 is made of a stainless steel plate of an austenite system (for example, SUS304 according to the Japanese Industrial Standards) having a rust resistance or a cold rolled steel plate treated to have a resistance to rusting (SPCC system or the like according to the Japanese Industrial Standards) and is press-worked to represent a cap-like shape including a cylindrical portion 13 and a bottom portion 12c.

As shown on an enlarged scale in FIG. 7, the cylindrical portion 13 of the sensor cap 12 includes a mounting area 12d adapted to be press-fitted into an inner peripheral surface of a pilot portion 1c of the outer member 1, and a collar 12a formed by bending the cylindrical portion 13 in a radially outward direction of the bearing assembly and then turning it backward in an overlapped fashion and adapted to define a positioning portion for the sensor cap 12 during the press-fitting. This collar 12a has an annular sealing lip 26 bonded integrally thereto by vulcanization, which lip 26 is made of an elastic material such as rubber and is held in contact with an inner peripheral surface of the knuckle N.

As described hereinabove, since in the second embodiment the sensor cap 12 fixed to the pilot portion 1c of the outer member 1 is prepared from a steel plate having a rust resistance and also since the sealing lip 26 that contacts the inner peripheral surface of the knuckle N is integrally bonded to the sensor cap 12, not only can the sensor connector 22, made of the synthetic resin, be prevented from being deteriorated under a severe environment full of muddy salt water or the like for a long period of time, but an ingress of the muddy salt water and/or dusts through a gap between the pilot portion 1c and the mounting area 12a of the sensor cap 12 can also be avoided and, therefore, it is possible to provide a rotation sensor incorporated bearing assembly, in which the sealability of the pilot portion 1c of the outer member 1 and the sealability between the pilot portion 1c and the knuckle N are increased. Accordingly, there is no inconvenience that due to the presence of rusting the outer member 1 cannot be removed from the knuckle N and, also, the reduction of the detecting precision of the rotation sensor 16A, which would occur when the cover 5 displaces as a result of development of the rusting, can be avoided.

FIG. 8 illustrates a modification of FIG. 7. An annular sealing lip 27 made of an elastic material such as rubber is integrally bonded by vulcanization to the collar 12a in the cylindrical portion 13 of the sensor cap 12 and is held in tight contact with the inner peripheral surface of the knuckle N and the pilot portion 1c of the outer member 1. In this way, it is possible to further prevent the muddy salt water and/or dusts from entering from the pilot portion 1c.

Figure 9:
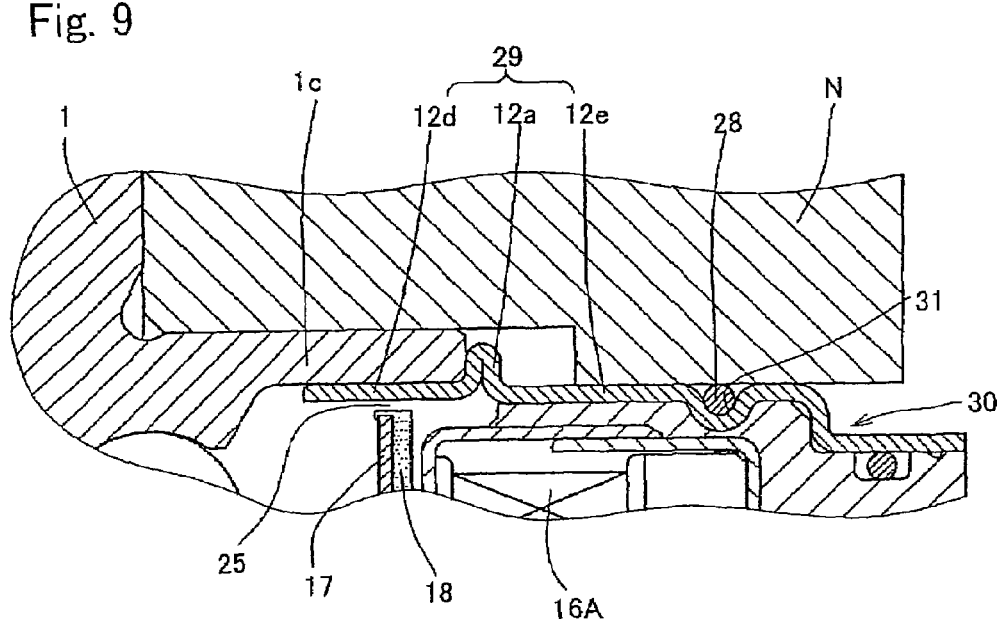
FIG. 9 is an enlarged view of an important portion of the rotation sensor incorporated bearing assembly according to a third preferred embodiment of the present invention.
Figure 9:
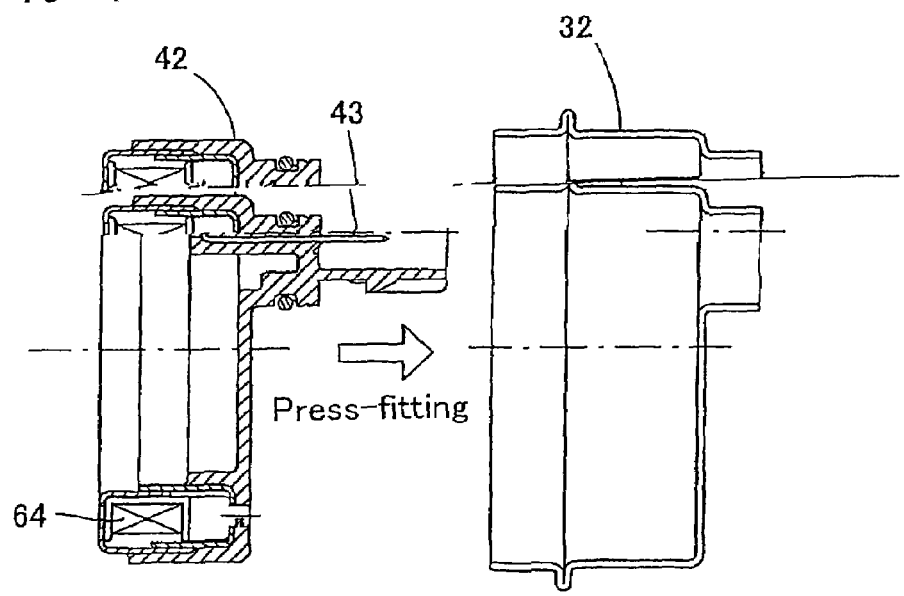

FIG. 9 is an enlarged view of an important portion of the rotation sensor incorporated bearing assembly according to a third preferred embodiment of the present invention. It is to be noted that components and sites similar to those employed in the previously described second embodiment are designated by like reference numerals used in connection with the second embodiment and, therefore, the details thereof are not reiterated for the sake of brevity.

The sensor cap 30 is prepared from a stainless steel plate of an austenite system (for example, SUS304 according to the Japanese Industrial Standards) having a rust resistance or a cold rolled steel plate (for example, SPCC according to the Japanese Industrial Standards) treated to have a rust resistance and is press-worked to represent a cap-like shape.

The cylindrical portion 29 of the sensor cap 30 includes a mounting area 12d adapted to be press-fitted into the inner peripheral surface of the pilot portion 1c of the outer member 1, the collar 12a formed by bending the cylindrical portion 13 in a radially outward direction of the bearing assembly and then turning it backward in an overlapped fashion and adapted to define a positioning portion for the sensor cap 12 during the press-fitting, and a guide portion 12e extending axially from this collar 12a. The guide portion 12e is formed with an annular groove 31, in which a sealing ring 28 such as an O-ring is seated. The sealing ring 28 is held in contact with the inner peripheral surface of the knuckle N to prevent muddy salt water and/or dusts from entering into the bearing assembly and the pilot portion 1c.

An outer diametric edge of the slinger 17 press-fitted onto the inner race (not shown) is held in face-to-face relation with the cylindrical portion 29 of the sensor cap 30 with a slight radial gap left therebetween to form a labyrinth seal 25. Accordingly, with the simplified structure, it is possible to prevent a lubricant grease, filled in the bearing assembly, from leaking into the inside of the cover 21, allowing the durability of the bearing assembly to be maintained for a long period of time.

The rotation sensor incorporated bearing assembly to which the present invention pertains can be applied not only to the structure of the third generation type, but also to the structure of the first or second generation type. Also, although the pulsar ring has been shown and described as employed in the form of the magnetic encoder magnetized to have the magnetic poles N and S alternating with each other in the circumferential direction, it may not be always limited thereto, but may be of a structure, in which the pulsar ring is formed with indentation or throughholes in the circumferential direction thereof. Accordingly, depending on the type of this pulsar ring, the rotation sensor can be suitably selected from a Hall IC element, a Magnetic resistance element (MR element) and others.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly with a rotation sensor, comprising:

an outer member inserted in a knuckle forming a part of a suspension system and having an inner periphery formed with double rows of outer raceway surfaces;

an inner member made up of a hub axle having one end formed integrally with a wheel mounting flange and having an outer periphery formed with a reduced diameter stepped portion extending axially from the wheel mounting flange, and an inner race press-fitted onto the reduced diameter stepped portion of the hub axle, said inner member having an outer periphery formed with double rows of inner raceway surfaces opposed respectively to the double rows of the outer raceway surfaces of the outer member;

double rows of rolling elements accommodated rotatably between the inner member and the outer member;

a cover closing an opening of one end of the outer member and including a sensor connector, formed to represent a cap-like shape and made of a synthetic resin, and a sensor cap made of a metallic material;

a pulsar ring mounted on the inner race; and a rotation sensor opposed to the pulsar ring and embedded in the sensor connector, wherein the cover is formed from a steel plate, having a rust resistance, by means of a press-work to represent the cap-like shape and extends over an outer surface of the sensor connector so as to cover the sensor connector, and wherein the cover has a cylindrical portion mounted in an inner peripheral surface of one end of the outer member, which end forms a pilot portion for the knuckle, the cylindrical portion of the cover having an outer periphery provided with an annular elastic member held in contact with an inner peripheral surface of the knuckle.

2. The bearing assembly with the rotation sensor as claimed in claim 1, wherein the cylindrical portion of the cover is formed with an annular groove and the elastic member is engaged in the annular groove.

3. The bearing assembly with the rotation sensor as claimed in claim 1, wherein the cylindrical portion of the cover includes a mounting area, adapted to be mounted in the outer member, and a collar that is formed by bending the cylindrical portion in a radially outward direction of the bearing assembly and then turning it backward in an overlapped fashion.

4. The bearing assembly with the rotation sensor as claimed in claim 3, wherein the collar is integrally bonded with the elastic member having a lip.

5. The bearing assembly with the rotation sensor as claimed in claim 1, wherein the pulsar ring includes a cylindrical portion mounted on the outer periphery of the inner race, an upright portion extending radially outwardly from the cylindrical portion, and a magnetic encoder integrally bonded to a side face of the upright portion and made of an elastomer mixed with a powder of ferromagnetic material and magnetized to have circumferentially alternating magnetic poles N and S, and wherein an outer diametric edge of the upright portion is held in face-to-face relation with the cylindrical portion of the sensor cap with a slight radial gap formed therebetween to define a labyrinth seal.

* * * * *